(12) United States Patent
Gupta et al.

(10) Patent No.: US 9,347,434 B2
(45) Date of Patent: May 24, 2016

(54) WIND TURBINE AND A METHOD OF OPERATING THEREOF

(71) Applicant: VESTAS WIND SYSTEMS A/S, Aarhus N (DK)

(72) Inventors: Amit Kumar Gupta, Singapore (SG); Hock Heng Thia, Singapore (SG); Duy Duc Doan, Tilst (DK); Gert Karmisholt Andersen, Hovedgård (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 14/362,052

(22) PCT Filed: Dec. 21, 2012

(86) PCT No.: PCT/DK2012/050503
§ 371 (c)(1),
(2) Date: May 30, 2014

(87) PCT Pub. No.: WO2013/097867
PCT Pub. Date: Jul. 4, 2013

(65) Prior Publication Data
US 2014/0312622 A1    Oct. 23, 2014

Related U.S. Application Data

(60) Provisional application No. 61/581,656, filed on Dec. 30, 2011.

(30) Foreign Application Priority Data

Dec. 29, 2011  (DK) .................................. 2011 70766

(51) Int. Cl.
*F03D 9/00*  (2006.01)
*H02J 3/38*  (2006.01)
(Continued)

(52) U.S. Cl.
CPC .............. *F03D 9/003* (2013.01); *F03D 7/0264* (2013.01); *H02J 3/386* (2013.01); *H02P 29/024* (2013.01); *H02P 9/08* (2013.01); *Y02E 10/723* (2013.01); *Y02E 10/763* (2013.01)

(58) Field of Classification Search
CPC ........ F03D 7/0264; F03D 9/003; H02J 3/386; H02P 29/024; H02P 9/08
See application file for complete search history.

(56) References Cited

U.S. PATENT DOCUMENTS 7,095,128 B2 * 8/2006 Canini et al. ..................... 290/44
2007/0279815 A1 12/2007 Li et al.
(Continued)

OTHER PUBLICATIONS

International Search Report for PCT/DK2012/050503, Nov. 7, 2013.
(Continued)

*Primary Examiner* — Tulsidas C Patel
*Assistant Examiner* — Viet Nguyen
(74) *Attorney, Agent, or Firm* — Patterson + Sheridan, LLP (57) ABSTRACT

A wind turbine is provided. The wind turbine comprises a generator, a power converter for converting at least a portion of electrical power generated by the generator, an energy dissipating unit and a controller. The power converter comprises a generator-side converter, a grid-side converter and a DC (direct current) link there between. The energy dissipating unit is operatively coupled to the DC-link. The controller is adapted to activate the energy dissipating unit to dissipate energy from the DC-link in response to a shutdown request.

18 Claims, 5 Drawing Sheets

(51) Int. Cl.
  *F03D 7/02* (2006.01)
  *H02P 29/02* (2016.01)
  *H02P 9/08* (2006.01)

(56) References Cited

U.S. PATENT DOCUMENTS

| | | | |
|---|---|---|---|
| 2008/0150282 A1* | 6/2008 | Rebsdorf et al. | 290/44 |
| 2008/0296897 A1* | 12/2008 | Kovach et al. | 290/44 |
| 2009/0079193 A1* | 3/2009 | Nielsen et al. | 290/44 |
| 2009/0206606 A1* | 8/2009 | Jorgensen et al. | 290/44 |
| 2010/0002475 A1 | 1/2010 | Folts et al. | |
| 2010/0327584 A1* | 12/2010 | Fortmann | 290/44 |
| 2011/0133461 A1* | 6/2011 | Hjort | 290/44 |
| 2011/0163544 A1 | 7/2011 | Gupta et al. | |
| 2013/0033268 A1* | 2/2013 | Parkhou | F03D 11/00 324/511 |

OTHER PUBLICATIONS

Danish Search Report for PA 2011 70766, Jul. 17, 2012.

* cited by examiner

WIND TURBINE AND A METHOD OF OPERATING THEREOF

FIELD OF THE INVENTION

The present invention relates generally to a wind turbine, and in particular, to a method for operating a wind turbine when a shutdown request is received.

BACKGROUND OF THE INVENTION

A wind turbine is an energy conversion system which converts kinetic wind energy into electrical energy for power grids. Specifically, wind incident on blades of the wind turbine generator (WTG) causes a rotor of the WTG to rotate. The mechanical energy of the rotating rotor in turn is converted into electrical energy by an electrical generator. As wind speed fluctuates, the frequency of the AC (alternating current) voltage/current generated by the generator varies. Therefore, it is common for a wind turbine to have a power converter to convert the variable frequency AC voltage/current from the generator to a substantially fixed frequency AC voltage/current suitable to be connected/transmitted to AC transmission/distribution networks or power grids via a transformer.

A full scale power converter based wind turbine usually includes a power converter having a generator side converter coupled to a grid side converter via a direct current (DC) link. The generator side converter regulates the power of the generator. This power passes through the DC-link, and is eventually fed to the grid through the grid side converter. The grid side converter regulates the grid side power. The DC-link is an intermediary stage in the power converter, and is maintained at a constant DC-link reference voltage during the operation of the wind turbine. This reference voltage may be 1100 volts, for example. Normally the reference DC-link voltage is allowed to vary in a given voltage range e.g. 1050 to 1150V. The same is true for the Doubly Fed Induction Generator (DFIG) systems where only a portion of the power from the generator passes through the power converter.

A wind turbine may be requested to shutdown, for example due to a fault in the grid, component failure in the turbine/wind farm or requested by the grid operator. During a turbine shutdown, the controls of the generator side converter and grid side converter are disabled, and the respective circuit breakers between the generator and the power converter, and between the power converter and the power grid are opened. At this time, the voltage at DC-link is left to decay naturally. The time of the DC-link voltage decay is dependent on the capacitance and resistance of the DC-link. It is only safe for a technician to work (e.g. repair the faulty converter or maintenance) on the power converter/turbine when the DC-link voltage has decayed to 50 volts or below. Typically, the default resistance provided across the DC-link is significantly high e.g. in the range of 10 k ohms, and hence the time needed for the DC-link voltage to decay to 50 volts may take a few minutes. With the trend of increasing turbine size, the time taken for the DC-link voltage to decay to 50 volts also increases accordingly.

Even if the DC-link voltage is allowed to decay naturally (for example after 5 mins), there is no guarantee that the voltage has reached a level which is safe for the technician to work on.

Hence it is desirable to provide a fast ramp down of the DC-link voltage of a wind turbine during shutdown.

SUMMARY OF THE INVENTION

According to a first aspect of the invention, a wind turbine is provided. The wind turbine comprises a generator, a power converter for converting at least a portion of electrical power generated by the generator, an energy dissipating unit and a controller. The power converter comprises a generator-side converter, a grid-side converter and a DC (direct current) link therebetween. The energy dissipating unit is operatively coupled to the DC-link. The controller is adapted to activate the energy dissipating unit to dissipate energy from the DC-link in response to a shutdown request.

According to a second aspect of the invention, a method of operating a wind turbine is provided. The wind turbine comprises a power converter for converting at least a portion of electrical power generated by a generator and a dissipating unit being operatively coupled to a DC (direct current) link of the power converter. The method comprises receiving a request to shut down the wind turbine, and activating the energy dissipating unit to dissipate energy from the DC-link in response to the shutdown request.

BRIEF DESCRIPTION OF THE DRAWINGS

The invention will be better understood with reference to the detailed description when considered in conjunction with the non-limiting examples and the accompanying drawings.

DETAILED DESCRIPTION OF THE INVENTION

In the following, reference is made to embodiments of the invention. However, it should be understood that the invention is not limited to specific described embodiments. Instead, any combination of the following features and elements, whether related to different embodiments or not, is contemplated to implement and practice the invention.

Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

According to the first aspect of the invention, a wind turbine is provided. The wind turbine comprises a generator, a power converter for converting at least a portion of electrical power generated by the generator, an energy dissipating unit and a controller. The power converter comprises a generator-side converter, a grid-side converter and a DC (direct current) link therebetween. The energy dissipating unit is operatively coupled to the DC-link. The controller is adapted to activate the energy dissipating unit to dissipate energy from the DC-link in response to a shutdown request.

A generator is an electromechanical machine capable of converting mechanical energy into electrical energy. The generator used in a wind turbine could be any type of generator including but not limited to, a permanent magnet generator, doubly-fed induction generator and squirrel cage induction generator. The electrical power from the generator has a variable frequency due to the variable rotational speed of the rotor. A portion or all of the electrical energy or power generated by the generator is converted by the power converter into a fixed frequency electrical power suitable to be transmitted or connected to a power grid or a load.

The energy dissipating unit is coupled to the DC-link of the power converter. The energy dissipating unit may also be known as a DC chopper circuit, and can dissipate energy at the DC-link.

A controller is adapted to activate the energy dissipating unit to dissipate energy from the DC-link in response to the shutdown request. This shutdown request or command may be generated by, for example, a safety controller due to events which require the turbine to be shutdown. These events include but not limited to a component fault in the turbine or a grid fault. The turbine may also be requested to shut down by a person such as a technician or a grid operator. The activation of the energy dissipating unit includes establishing an electrical connection between the dissipating unit and the DC-link, thereby allowing energy stored in the DC-link to flow into the energy dissipating unit to be dissipated.

By activating the energy dissipating unit during shutdown of the turbine, voltage at the DC-link is actively reduced instead of letting it decay or discharge naturally. Accordingly, the voltage level at the DC-link is brought down to near zero value at a very fast rate. This greatly reduces the waiting time before a technician can work on the turbine, and also improve the safety of the technician.

In certain configurations of wind turbine, there may be a plurality of power converters connected in parallel. In such configurations, the DC-links of each power converter may be connected in parallel with each other. The decay rate of the voltage at each DC-link may vary and there might be residual voltages in one of the DC-links if the voltage of that DC-link is not decayed to sufficiently low level. When the DC-links are connected again after discharging, there may be inrush currents among the DC-links due to the residual voltage, and this may lead to damage in the components of the power converter especially the components used for connecting DC-links of the parallel power converters.

According to the first aspect of the invention, this problem is eliminated as the voltage at each DC-link is brought down to near zero by the energy dissipating unit. Accordingly, there is no residual voltage at any of the DC-links, and hence no inrush currents among the DC-links when the DC-links are connected again.

According to an embodiment, the wind turbine further comprises a circuit breaker for disconnecting the wind turbine from a power grid, and the controller is adapted to open the circuit breaker before activating the energy dissipating unit in response to the shutdown request.

The opening of the circuit breaker introduces an open circuit between the wind turbine and the power grid, thereby disconnecting the wind turbine from the power grid. By disconnecting the wind turbine from the grid, no power is drawn from the power grid when the energy dissipating unit is dissipating energy from the DC-link.

According to an embodiment, the controller is adapted to control the grid-side converter to stop the operation of the grid-side converter prior to opening the circuit breaker in response to the shutdown request. The grid-side converter is controlled by PWM (pulse width modulation) signals. Specifically, the PWM signals control the switching of semiconductor switches (e.g. transistors) of the grid-side converter, and hence the operation of the grid-side converter. In a further embodiment, the controller stops the operation of the grid-side converter by inhibiting the PWM signals.

According to an embodiment, the controller is adapted to decrease a voltage at the DC-link to a predetermined value prior to stopping the operation of the grid-side converter. When the operation of the grid-side converter is stopped at the predetermined value (which is lower than the original DC-link voltage level), switching transients are reduced.

According to an embodiment, the energy dissipating unit comprises at least a switch and at least a resistor. The energy dissipating unit is activated by closing the switch. The switch may be a power semiconductor device such as an Integrated Gate Bipolar Transistor (IGBT) which can be turned on or off by a suitable gate voltage through a gate driver. Other power semiconductor devices or switches are possible. In alternative embodiments, the energy dissipating unit may include at least a switch and at least one of a resistor, an inductor or a capacitor.

According to a further embodiment, the at least one resistor comprises a bank of resistors.

According to the second aspect of the invention, a method of operating a wind turbine is provided. The wind turbine comprises a power converter for converting at least a portion of electrical power generated by a generator and an energy dissipating unit being operatively coupled to a DC (direct current) link of the power converter. The method comprises receiving a request to shut down the wind turbine, and activating the energy dissipating unit to dissipate energy from the DC-link in response to the shutdown request.

According to an embodiment, the method further comprises opening a circuit breaker arranged between the wind turbine and a power grid before activating the energy dissipating unit in response to the shutdown request.

According to an embodiment, the method further comprises controlling the power converter to stop the operation of the power converter prior to opening the circuit breaker in response to the shutdown request.

According to an embodiment, the method further comprises controlling the power converter to decrease a voltage at the DC-link to a predetermined value prior to stopping the operation of the power converter.

The following is a detailed description of embodiments of the invention depicted in the accompanying drawings. The embodiments are examples and are in such detail as to clearly communicate the invention. However, the amount of detail offered is not intended to limit the anticipated variations of embodiments; but on the contrary, the intention is to cover all modifications, equivalents, and alternatives falling within the spirit and scope of the present invention as defined by the appended claims.

Figure 1:
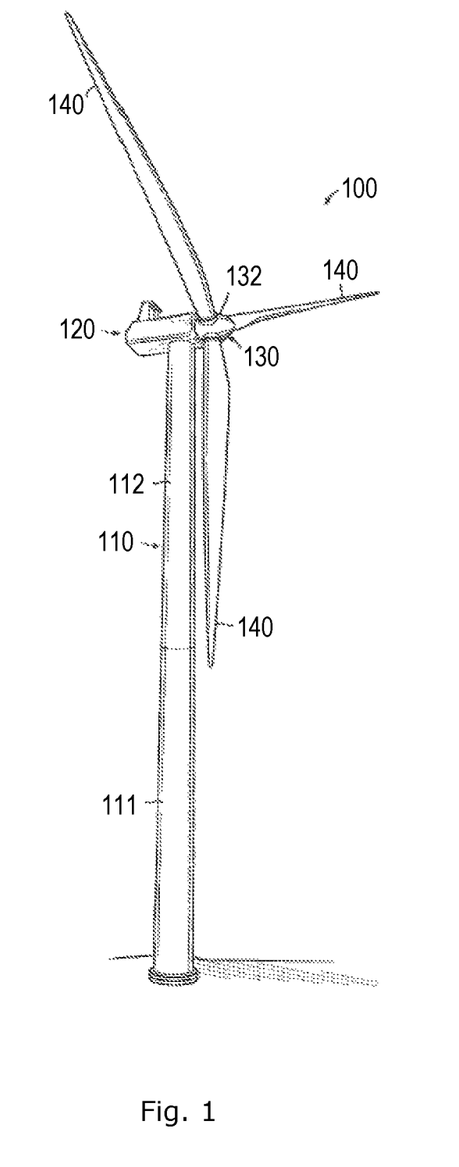
FIG. 1 shows a general structure of a wind turbine.

FIG. 1 illustrates an exemplary wind turbine 100 according to an embodiment. As illustrated in FIG. 1, the wind turbine 100 includes a tower 110, a nacelle 120, and a rotor 130. In one embodiment, the wind turbine 100 may be an onshore wind turbine. However, embodiments of the invention are not limited only to onshore wind turbines. In alternative embodiments, the wind turbine 100 may be an offshore wind turbine located over a water body such as, for example, a lake, an ocean, or the like. The tower 110 of such an offshore wind turbine is installed on either the sea floor or on platforms stabilized on or above the sea level.

The tower 110 of the wind turbine 100 may be configured to raise the nacelle 120 and the rotor 130 to a height where strong, less turbulent, and generally unobstructed flow of air may be received by the rotor 130. The height of the tower 110 may be any reasonable height, and should consider the length of wind turbine blades extending from the rotor 130. The tower 110 may be made from any type of material, for example, steel, concrete, or the like. In some embodiments the tower 110 may be made from a monolithic material. However, in alternative embodiments, the tower 110 may include a plurality of sections, for example, two or more tubular steel sections 111 and 112, as illustrated in FIG. 1. In some embodiments of the invention, the tower 110 may be a lattice tower. Accordingly, the tower 110 may include welded steel profiles.

The rotor 130 may include a rotor hub (hereinafter referred to simply as the "hub") 132 and at least one blade 140 (three such blades 140 are shown in FIG. 1). The rotor hub 132 may be configured to couple the at least one blade 140 to a shaft (not shown). In one embodiment, the blades 140 may have an aerodynamic profile such that, at predefined wind speeds, the blades 140 experience lift, thereby causing the blades to radially rotate around the hub. The hub 140 further comprises mechanisms (not shown) for adjusting the pitch of the blade 140 to increase or reduce the amount of wind energy captured by the blade 140. Pitching adjusts the angle at which the wind strikes the blade 140. It is also possible that the pitch of the blades 140 cannot be adjusted. In this case, the aerodynamic profile of the blades 140 is designed in a manner that the lift experienced by the blades are lost when the wind speed exceeded a certain threshold, causing the turbine to stall.

The hub 132 typically rotates about a substantially horizontal axis along a drive shaft (not shown) extending from the hub 132 to the nacelle 120. The drive shaft is usually coupled to one or more components in the nacelle 120, which are configured to convert the rotational energy of the shaft into electrical energy.

Although the wind turbine 100 shown in FIG. 1 has three blades 140, it should be noted that a wind turbine may have different number of blades. It is common to find wind turbines having two to four blades. The wind turbine 100 shown in FIG. 1 is a Horizontal Axis Wind Turbine (HAWT) as the rotor 130 rotates about a horizontal axis. It should be noted that the rotor 130 may rotate about a vertical axis. Such a wind turbine having its rotor rotates about the vertical axis is known as a Vertical Axis Wind Turbine (VAWT). The embodiments described henceforth are not limited to HAWT having 3 blades. They may be implemented in both HAWT and VAWT, and having any number of blades 140 in the rotor 130.

Figure 2:
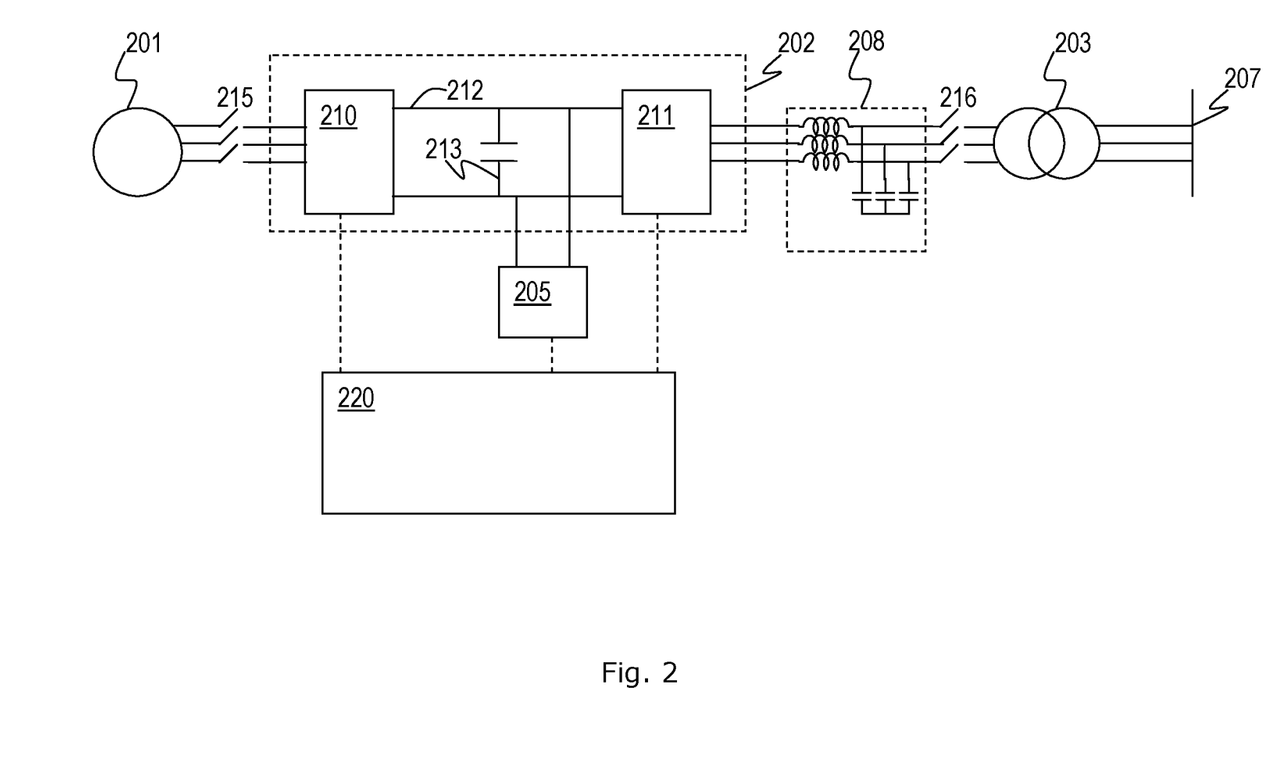
FIG. 2 shows an electrical system layout of the wind turbine with an energy dissipating unit.

FIG. 2 shows an electrical system of the wind turbine having an energy dissipating unit or a chopper circuit 205 according to an embodiment. The electrical system includes a generator 201, a power converter 202 and a main transformer 203. The electrical system is connected to a power grid 207. The power converter 202 includes a generator-side converter 210 and a grid-side converter 211 connected via a direct current (DC) link 212. The DC-link 212 includes a DC-link capacitor 213. The energy dissipating circuit 205 is connected to the DC-link 212. The electrical system includes grid-side filters 208 for filtering switching harmonics. The electrical system includes a generator-side breaker 215 between the generator 201 and the generator side converter 210, and a grid-side breaker 216 between the grid harmonic filter 208 and the transformer 203. The grid-side breaker 216 may be placed at other locations, for example between the grid-side converter 211 and the grid harmonic filter 208.

The generator 201 converts mechanical energy or power to electrical energy or power having AC voltage and current (collectively referred to as "AC signals"), and provides the generated AC signals to the generator-side converter 210. The AC signals from the generator 201 have a variable frequency, due to varying wind. The generator-side converter 210 converts or rectifies the AC signals to DC voltage and current (collectively know as "DC signals"). The grid-side converter 211 converts the DC signals from the DC-link 212 into fixed frequency AC signals for the power grid 207. The voltage of the fixed frequency AC signals at the output of the grid-side converter 211 is stepped up by the main transformer 203 into a level suitable to be received and transmitted by the power grid 207. The operation of the generator-side converter 210 and the grid-side converter 211 is controlled by a controller 220.

The energy dissipating circuit 205 is connected to the DC-link 212 and is adapted to dissipate energy stored at the DC-link 212. The energy dissipating circuit 205 includes at least one switch and a plurality of chopper resistors (not shown). The operation of the energy dissipating circuit 205 is controlled by activating the switch. When the switch is closed, energy stored at the DC-link 212 is dissipated by the chopper resistors. The activation of the switch and hence the operation of the energy dissipating circuit 205 is controlled by the controller 220.

The generator-side converter 210 and the grid-side converter 211 comprises a plurality of power semiconductor switches such as IGBTs (Insulated Gate Bipolar Transistors) and their operations are controlled by switching signals (also known as PWM signals) at a specific switching frequency. The switching signals for controlling the operation of the converters 210, 211 are generated by the controller 220. By controlling the switching signals, the controller 220 is thus able to control the operation of the power converter and regulate the AC signals at the output of the grid-side converter 211.

It should be noted that FIG. 2 is only an illustration of an electrical system in a wind turbine where only common components are shown. The electrical system may include other components such as generator-side filters, sensors, pre-charge arrangement, etc. In another embodiment, a doubly-fed induction generator (DFIG) may be used wherein the stator windings of the generator are connected to the grid via the turbine transformer, and the rotor windings of the generator is connected to the turbine transformer via a power converter system. The energy dissipating circuit 205 may only have one resistor instead of a plurality of resistors. The energy dissipating circuit 205 may also include other dissipating units suitable for dissipating power.

Figure 3:
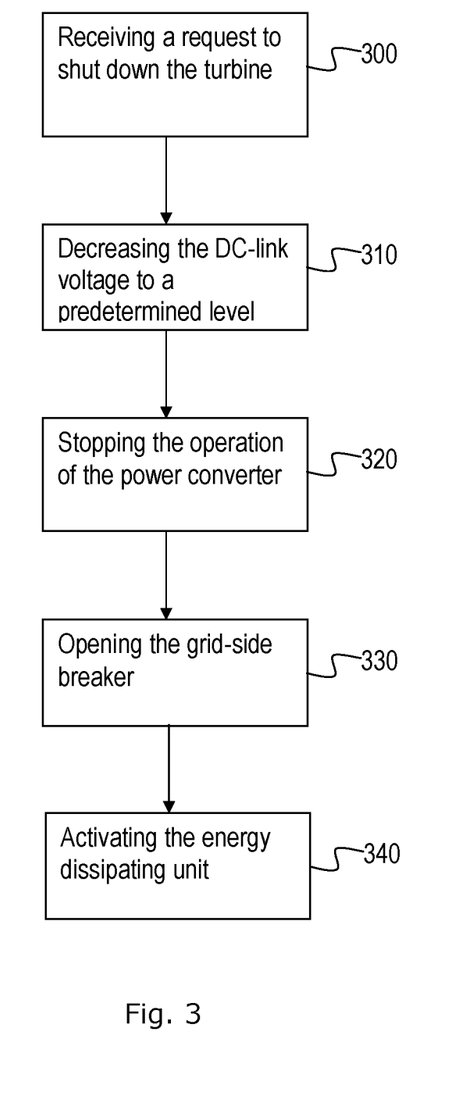
FIG. 3 shows a flow chart of a method for operating the wind turbine during shut down according to an embodiment.

FIG. 3 shows a flow chart of a method of operating the wind turbine during shutdown according to an embodiment. Step 300 includes receiving a request to shut down the turbine. The turbine may be requested to shut down, for example due to a fault in a component of the turbine, a fault in the grid or requested by a turbine owner. This shutdown request is received by the controller and the controller initiates the shutdown procedure according to the embodiment.

Step 310 includes decreasing the voltage at the DC-link to a predetermined level. The voltage at the DC-link may be, for example, at about 1100V which may be unsafe for converters to be disabled. The decrease of the DC-link voltage to the predetermined level is to facilitate a safe disabling of the grid-side converter by avoiding switching transients. The predetermined DC-link voltage level, $V_{L\_disable\_PWM}$, may be determined as $\sqrt{2}*V_{Line}$, wherein $V_{Line}$ is the actual/nominal line voltage (i.e. voltage at the output of the grid-side converter 211 or at the low voltage terminal of the turbine). The predetermined DC-link voltage level, $V_{L\_disable\_PWM}$, may be more accurately represented as $k*\sqrt{2}*V_{Line}$ wherein k=1.00-1.05 for example. The value of k could change in other situations.

Step 320 includes stopping the operation of the power converter after the voltage at the DC-link has decreased to the predetermined level. The operation of the grid-side converter 211 is stopped by the controller 220 by disabling the PWM signal. Step 330 includes opening the grid side breaker between the power converter and the power grid after the operation of the grid-side converter has stopped, i.e. the PWM signal for the grid-side converter 211 has been disabled.

Step 340 includes activating the energy dissipating unit to dissipate energy from the DC-link. In an embodiment, the switch of the energy dissipating unit is closed and energy is dissipated through the resistors of the energy dissipating unit. In a further embodiment, the switch of the energy dissipating unit is fully turned on (i.e. for a whole period) to dissipate the energy stored in the DC-link. In an alternative embodiment, the operation of the switch of the energy dissipating unit is controlled to dissipate a predefined amount of energy from the DC-link. The switch may be turned on and off based on a signal having a predetermined duty ratio.

Figure 4:
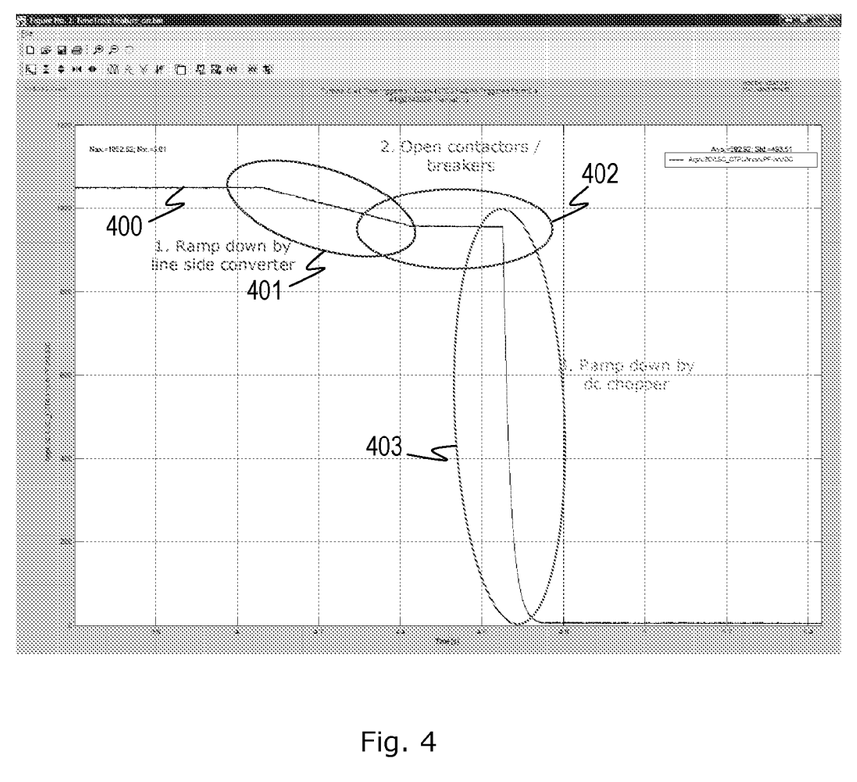
FIG. 4 shows a graph illustrating the DC-link voltage decay against time when the turbine is in shutdown process according to the method of FIG. 3.

FIG. 4 shows a graph 400 illustrating the voltage decay of the DC-link against time when the turbine is in the shutdown process according to the method of FIG. 3. At about t=4.05 s, a shutdown request is received, and the DC-link voltage is decreased to the predetermined value at about t=4.45 s as shown in region 401. At about t=4.45 s, the grid side breaker is opened and the energy dissipating unit is activated to dissipate energy from the DC-link at about t=4.65 s. During the time when the grid side breaker is opened and before the energy dissipating unit is activated, the DC-link voltage remains substantially constant as shown in region 402. Once the energy dissipating unit is activated, the DC-link voltage drops to near zero value at about t=4.7 s as shown in region 403.

It can be seen from FIG. 4 that according to the method of the embodiment, the DC-link voltage is ramped down from about 950V to near 0V in about 0.05 s. This near 0V value is way below the 50V which is considered to be safe for a technician to work on. The total time taken for the decreasing the DC-link voltage to the predetermined level, opening the grid side breaker and further reducing the DC-link voltage at the predetermined level to near zero is about 0.65 s. This is much faster compared to the few minutes needed for the DC-link voltage to decay naturally according to the prior art. Furthermore without an active control of the decay or decrease of the DC-link voltage as provided in the present embodiment, the technician will not know whether the DC-link voltage has indeed decayed to a safe level to work on. Therefore the embodiments of the invention provide a fast and sure way of ensuring that the DC-link voltage has decreased to the safe level.

Figure 5:
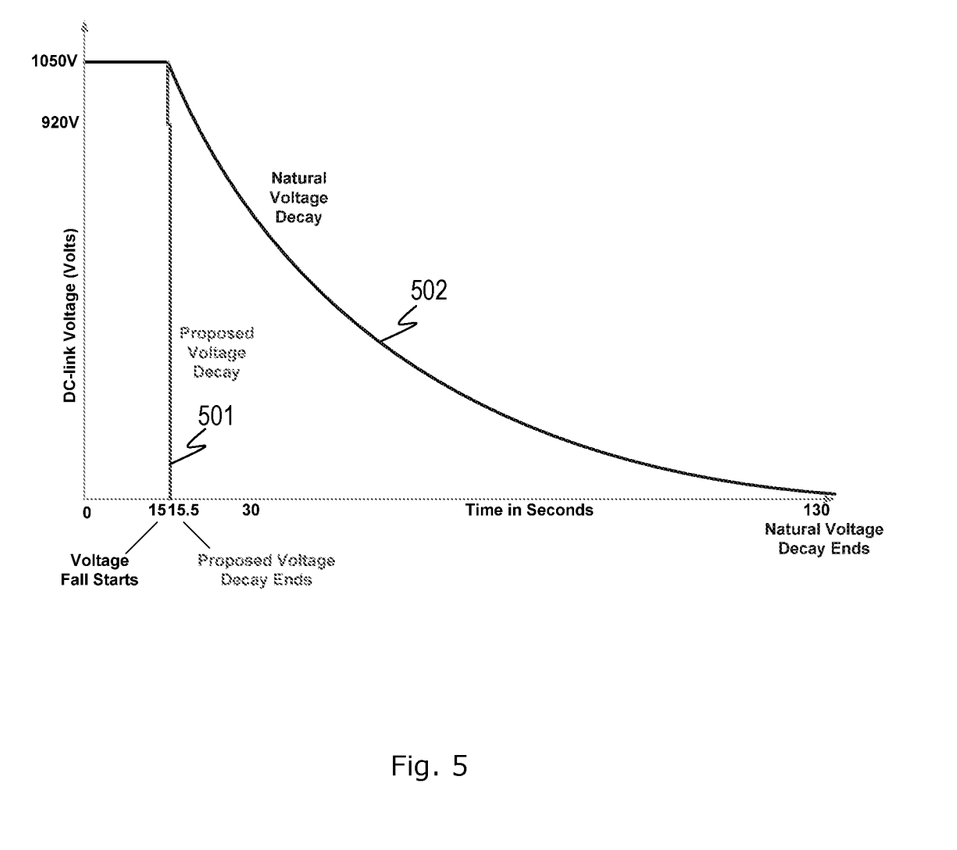
FIG. 5 shows a comparison of the decay time of the DC-link voltage according to an embodiment and according to the prior art.

FIG. 5 shows a comparison of the decay time of the DC-link voltage according to an embodiment and according to the prior art. Graph 501 shows the DC-link voltage according to the embodiment. Graph 502 shows the DC-link voltage according to the prior art. At about t=15 s, a shutdown request is given. It can be seen that the DC-link voltage according to the embodiment has decreased to near 0V at about t=15.5 s, whereas the DC-link voltage according to prior art has only decreased to near 0V after t=130 s.

It should be emphasized that the embodiments described above are possible examples of implementations which are merely set forth for a clear understanding of the principles of the invention. The person skilled in the art may make many variations and modifications to the embodiment(s) described above, said variations and modifications are intended to be included herein within the scope of the following claims.

The invention claimed is:

1. A wind turbine comprising:
   a generator;
   a first power converter for converting at least a portion of electrical power generated by the generator, the first power converter comprising a generator-side converter, a grid-side converter, and first direct current link (DC-link) disposed therebetween;
   an energy dissipating unit operatively coupled to the DC-link; and
   a controller configured to, upon determining to shut down the wind turbine:
   (a) reduce, prior to activating the energy dissipating unit, a DC-link voltage to a first predetermined voltage value,
   (b) stop operation of the grid-side converter when the DC-link voltage is reduced to the predetermined voltage value,
   (c) open a circuit breaker to thereby disconnect the wind turbine from an operatively coupled power grid, and
   (d) activate the energy dissipating unit to dissipate energy from the DC-link, wherein activating the energy dissipating unit to dissipate energy from the DC-link comprises reducing the DC-link voltage to a second predetermined voltage value for safely performing maintenance on the wind turbine.

2. The wind turbine according to claim 1, wherein the energy dissipating unit comprises a switch and at least one resistor, wherein the energy dissipating unit is activated by closing the switch.

3. The wind turbine according to claim 2, wherein the energy dissipating unit comprises a bank of resistors.

4. The wind turbine of claim 2, wherein the controller is further configured to operate the switch using a signal having a predetermined duty cycle.

5. The wind turbine of claim 1, wherein determining to shut down the wind turbine comprises one of receiving a request to shut down the wind turbine, detecting a fault of a component of the wind turbine, and detecting a fault of the power grid.

6. The wind turbine of claim 1, further comprising at least a second power converter coupled with the generator in parallel with the first power converter and including a second DC-link connected with the first DC-link.

7. The wind turbine of claim 1, wherein the controller is further configured to:
   deactivate the energy dissipating unit after dissipating a predetermined amount of energy from the DC-link.

8. The wind turbine of claim 1, wherein the controller is further configured to complete steps (a) through (d) in less than one second.

9. The wind turbine of claim 1, wherein the first predetermined voltage value of the DC-link is based on a line voltage at the output of the grid-side converter.

10. The wind turbine of claim 9, wherein the first predetermined voltage value of the DC-link is further based on a predetermined coefficient, wherein the first predetermined voltage value of the DC-link is controlled according to:

$$V_{pre}=k\times\sqrt{2}\times V_{Line},$$

where $V_{pre}$ represents the first predetermined voltage value, k represents the predetermined coefficient, and $V_{Line}$ represents the line voltage.

11. The wind turbine of claim 10, wherein a value of the predetermined coefficient is selected between 1.00 and 1.05.

12. A method of operating a wind turbine operatively coupled with a power grid through a circuit breaker, the wind turbine comprising a first power converter for converting at least a portion of electrical power generated by a generator, and further comprising an energy dissipating unit operatively coupled to direct current link (DC-link) of the first power converter, the method comprising:
(a) reducing upon determining to shut down the wind turbine and prior to activating the energy dissipating unit, a DC-link voltage to a first predetermined voltage value;
(b) stopping operation of a grid-side converter of the first power converter when the DC-link voltage is reduced to the first predetermined voltage value;
(c) opening the circuit breaker to thereby disconnect the wind turbine from the power grid; and
(d) activating the energy dissipating unit to dissipate energy from the DC-link, wherein activating the energy dissipating unit to dissipate energy from the DC-link comprises reducing the DC-link voltage to a second predetermined voltage value for safely performing maintenance on the wind turbine.

13. The method of claim 12, wherein the energy dissipating unit comprises a switch and at least one resistor, wherein the energy dissipating unit is activated by closing the switch.

14. The method of claim 13, wherein the energy dissipating unit comprises a bank of resistors.

15. The method of claim 12, wherein determining to shut down the wind turbine comprises one of receiving a request to shut down the wind turbine, detecting a fault of a component of the wind turbine, and detecting a fault of the power grid.

16. The method of claim 12, further comprising:
deactivating the energy dissipating unit after dissipating a predetermined amount of energy from the DC-link.

17. The method of claim 12, wherein steps (a) through (d) are completed in less than one second.

18. The method of claim 12, further comprising:
calculating the first predetermined voltage value of the DC-link based on a line voltage at the output of the grid-side converter, wherein the first predetermined voltage value of the DC-link is calculated according to:

$$V_{pre} = k \times \sqrt{2} \times V_{Line},$$

where $V_{pre}$ represents the first predetermined voltage value, k represents a predetermined coefficient selected between 1.00 and 1.05, and $V_{Line}$ represents the line voltage.

* * * * *